United States Patent [19]
Hanson

[11] B 3,994,160
[45] Nov. 30, 1976

[54] ACCELERATION BURST TEST APPARATUS AND METHOD FOR INTERNAL COMBUSTION ENGINES

[75] Inventor: Richard Eric Hanson, Winchester, Mass.

[73] Assignee: RCA Corporation, New York, N.Y.

[22] Filed: Apr. 21, 1975

[21] Appl. No.: 569,859

[44] Published under the second Trial Voluntary Protest Program on March 9, 1976 as document No. B 569,859.

[52] U.S. Cl. ................................... 73/116; 58/146
[51] Int. Cl.² ........................................ G01M 15/00
[58] Field of Search ............... 73/116, 133 R, 117.3; 58/146; 235/151.3

[56] References Cited
UNITED STATES PATENTS

| | | | |
|---|---|---|---|
| 3,331,200 | 7/1967 | Byron et al. | 73/116 UX |
| 3,657,922 | 4/1972 | Sibeud | 73/117.3 |
| 3,817,092 | 6/1974 | Ludloff | 73/133 R |

*Primary Examiner*—Jerry W. Myracle
*Attorney, Agent, or Firm*—Carl V. Olson; Edward J. Norton

[57] ABSTRACT

The full-power condition of an internal combustion diesel engine is tested by an acceleration burst test in which the engine initially operated at idle speed is suddenly given full throttle and caused to accelerate to a maximum governed speed. A tachometer means coupled to the engine produces one electrical pulse per engine cycle. The time taken in going between a predetermined low speed and a predetermined high speed is accurately determined, despite irregularities in the engine, by adding a portion determined by interpolation in the time period between pulses at the low speed, and a portion determined by interpolation in the time period between pulses at the high speed, to the intermediate time periods.

6 Claims, 5 Drawing Figures

ACCELERATION BURST TEST APPARATUS AND METHOD FOR INTERNAL COMBUSTION ENGINES

BACKGROUND OF THE INVENTION

The full-load testing of internal combustion engines at maximum safe speed can be accomplished by connecting the engine to a dynamometer capable of absorbing the full-load output of the engine and capable of measuring the speed, torque and horsepower of the engine. Dynamometers are very large, very expensive, and very inconvenient to use.

A much more economical and convenient apparatus for testing internal combustion engines under simulated full-load conditions is apparatus for operating the engine with all but one of $n$ ignitions interrupted, where $n$ may be greater than the number of cylinders, so that all cylinders are operated in sequence under full power conditions. The engine operates at full speed driving frictional and pumping loads, without danger of overspeeding and damaging the engine. Such apparatus is described in Pat. No. 3,757,570, issued on Sept. 11, 1973, to Cowley and Hulls; Pat. No. 3,757,571, issued on Sept. 11, 1973, to Chamberas; and Pat. No. 3,839,907, issued on Oct. 8, 1974, to Hanson and Fineman.

Another economical and convenient test of internal combustion engines under simulated full-load conditions is the acceleration burst test in which an engine initially operating at idle speed is suddenly given full throttle and caused to accelerate to a maximum governed speed. The inertia of the engine is the load on the engine, and the time taken to accelerate through a low speed to a high speed is a measure of the full-power, full-load condition of the engine. This test is particularly useful for testing diesel engines, and provides a somewhat less accurate indication of the condition of a spark ignition engine equipped with a carburetor instead of fuel injectors.

The accuracy with which the full power condition of the engine is given by the time taken to accelerate from a low speed to a high speed depends on the accuracy of the speed measurements, which are in units of angular displacement (such as revolutions) divided by units of time (such as minutes or seconds). An accurate measurement of speed is complicated by the fact that the burst acceleration from a low speed to a high speed takes only about one second or less. Another complication has been found to be due to pulsations in instantaneous speed which are due to explosions and compressions in individual cylinders of the engine. The pulsations in instantaneous speed are particularly disturbing if they are non-uniform due to malfunctioning of one or more individual cylinders of the engine.

SUMMARY OF THE INVENTION

A very economical, convenient and rapid acceleration burst test of the full-power condition of an engine is accomplished by generating one electrical pulse per engine cycle of the engine (one pulse per revolution of a two stroke engine, or one pulse per two revolutions of a four-stroke engine). An engine-cycle time period between successive electrical pulses is the reciprocal of the average speed during the engine cycle. Instantaneous speed fluctuations, which occur due to power and compression strokes in individual cylinders, follow the same pattern during all engine cycle time periods. The electrical pulses, which always occur at the same relative time in each engine cycle, are used to accurately measure the time taken to accelerate from a low engine speed to a high engine speed without errors due to instantaneous speed fluctuations. A portion of the time period between successive pulses at a predetermined low engine speed and a portion of the time period between successive pulses at a predetermined high engine speed are added to the intermediate time periods to provide an accurate time measure of the full-power condition of the engine.

DESCRIPTION OF THE PREFERRED EMBODIMENT

Figures 1, 2:
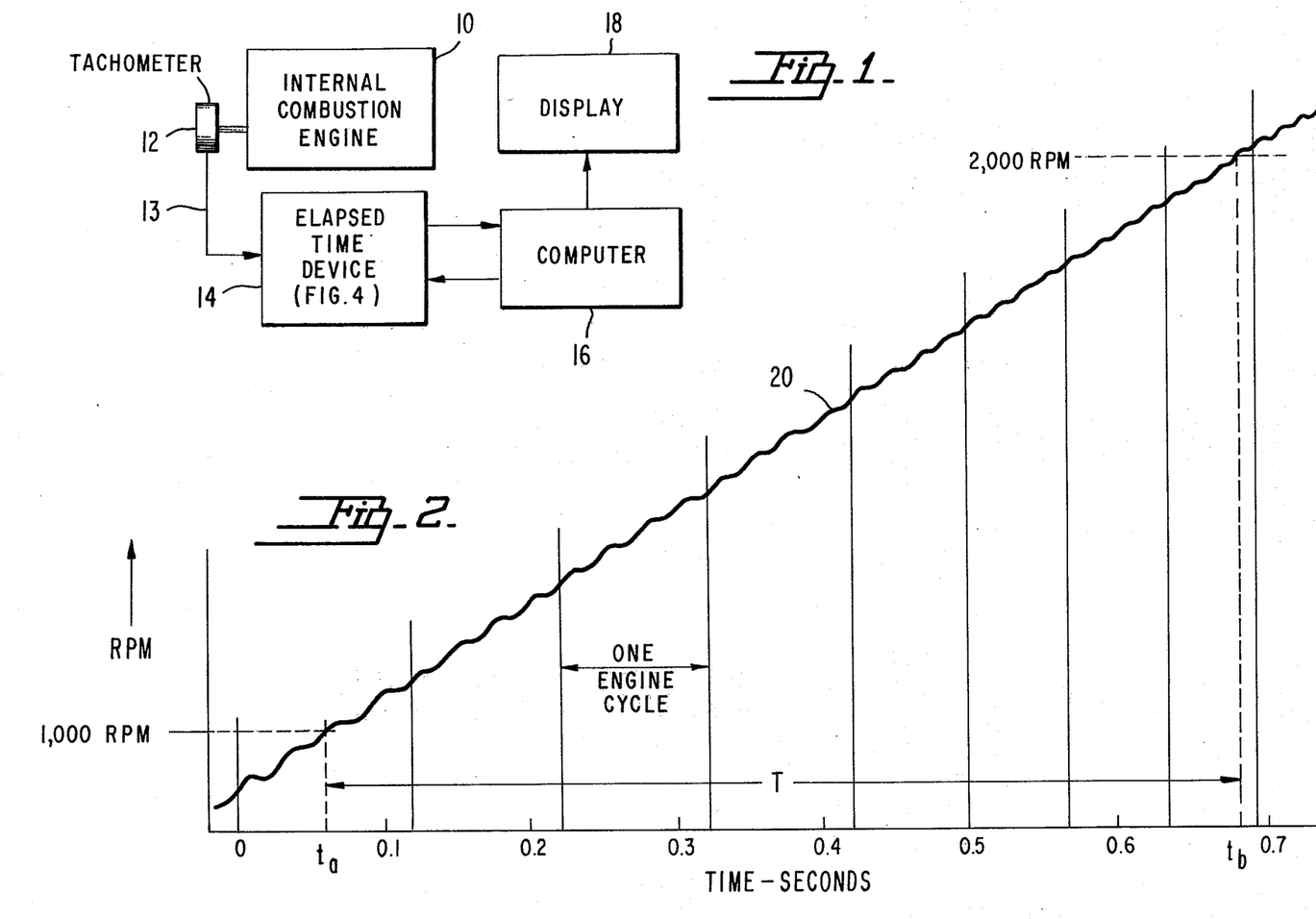
FIG. 1 is a block diagram of apparatus used for an acceleration burst test of the full-power condition of an internal combustion engine.
FIG. 2 is a chart of engine speed vs. time showing instantaneous speed fluctuations during acceleration of a four-cylinder engine.

Referring now in greater detail to the drawing, FIG. 1 shows an internal combustion engine 10, such as a diesel engine, equipped with a pulse tachometer 12, from which electrical pulses are applied over line 13 to an elapsed time device 14. The elapsed time device (shown in detail in FIG. 4) operates under the control of a computer 16 to measure time intervals. The computer 16 computes the test results for display by a display device 18.

The pulse tachometer 12 is simply a housing with a shaft driven by the engine, and a tooth or teeth on the shaft which passes or pass a magnetic pickup to produce one electrical pulse in the winding or coil of the pickup for each tooth on the shaft. The pulse tachometer 12 produces one or more electrical pulses per revolution of the engine crankshaft, and these pulses are applied to an elapsed time device 14 which, if necessary, reduces the number of pulses to one pulse per engine cycle.

The acceleration burst test to be described utilizes one electrical pulse per engine cycle. One engine cycle is defined as the time taken for the engine to accomplish intake, compression, power and exhaust in one cylinder. One engine cycle occurs in one crankshaft revolution of a two stroke engine because all four functions are accomplished in two strokes of the piston. On the other hand; one engine cycle occurs during two crankshaft revolutions of a four-stroke engine because the four functions are accomplished in four strokes of the piston.

FIG. 2 is a speed-time chart showing the acceleration characteristic 20 of an engine from 1000 rpm to 2000 rpm is a time period T. The solid vertical lines on the chart represent the boundaries of individual engine cycles and the times of electrical pulses from the tachometer 12. The line 20 in the chart shows speed fluctuations recurring similarly in each engine cycle. The engine represented is a four-cylinder engine having four power pulses per engine cycle causing four instantaneous speed peaks, and having four compression strokes per engine cycle causing four instantaneous speed dips. It can be seen that the instantaneous speed fluctuations may result in a short term reduction in speed while the average speed is increasing. These speed fluctuations introduce inaccuracies into any ordinary method of measuring the time T required to accelerate from a speed of 1000 rpm to a speed of 2000 rpm. The inaccuracies are even greater when the engine has one or two faulty cylinders which cause even greater irregularities in instantaneous speed during acceleration.

The accuracy with which the average acceleration time T can be measured is improved by deriving all time and speed measurements from tachometer pulses occurring once per engine cycle. All pulses occur at the same relative part of the respective engine cycles. Therefore, the time interval from a pulse at a low engine speed to a pulse at a high engine speed is unaffected by instantaneous speed changes during engine cycles. The average engine acceleration is assumed to be linear during an engine cycle and the next following engine cycle. The time $t_a$ when the engine reaches the low speed and the time $t_b$ when the engine reaches the high speed in determined by interpolation.

Figure 3:
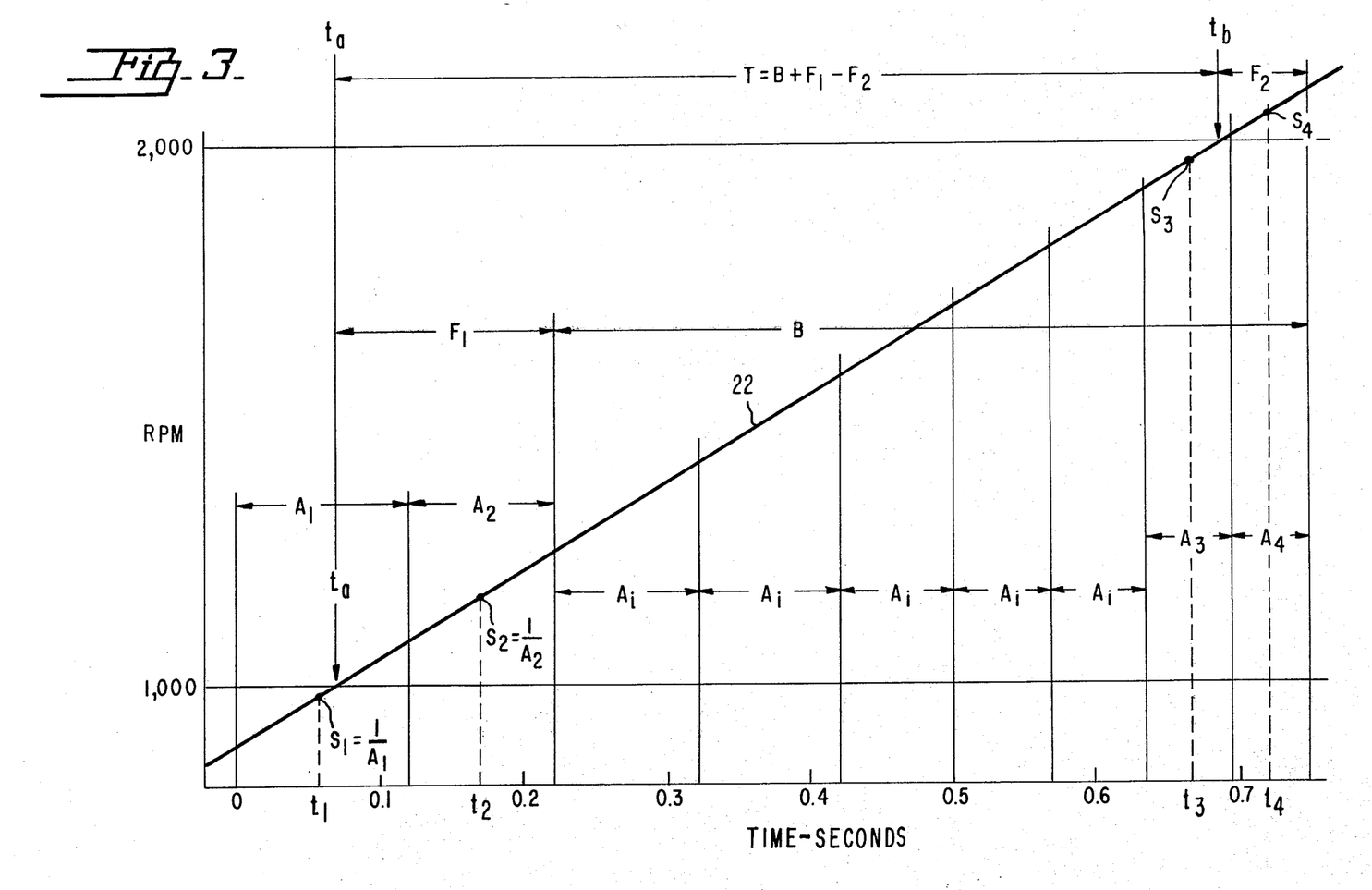
FIG. 3 is a chart of engine speed vs. time which will be referred to in describing the operation of the invention.

FIG. 3 is a speed-time chart similar to FIG. 2 but with the speed characteristic 22 smoothed to average out the instantaneous speed fluctuations. The acceleration time T from 1000 rpm at time $t_a$ to 2000 rpm at time $t_b$ is shown to be equal to $B+F_1-F_2$; where $F_1$ equals engine cycle time period $A_2$ plus an interpolated proportion of engine cycle time period $A_1$, B equals cycle time period $A_3$ plus cycle time period $A_4$ plus the sum of intermediate cycle time periods $A_i$, and $F_2$ equals cycle time period $A_4$ plus an interpolated proportion of cycle time period $A_3$. The average speed $S_1$ during engine cycle $A_1$ is the reciprocal of the time period $A_1$ and is less than 1000 rpm. The average speed $S_2$ during cycle $A_2$ is greater than 1000 rpm. Similarly, the average speeds $S_3$ and $S_4$ during engine cycles $A_3$ and $A_4$ are less than and greater than the high speed of 2000 rpm.

Figure 4:
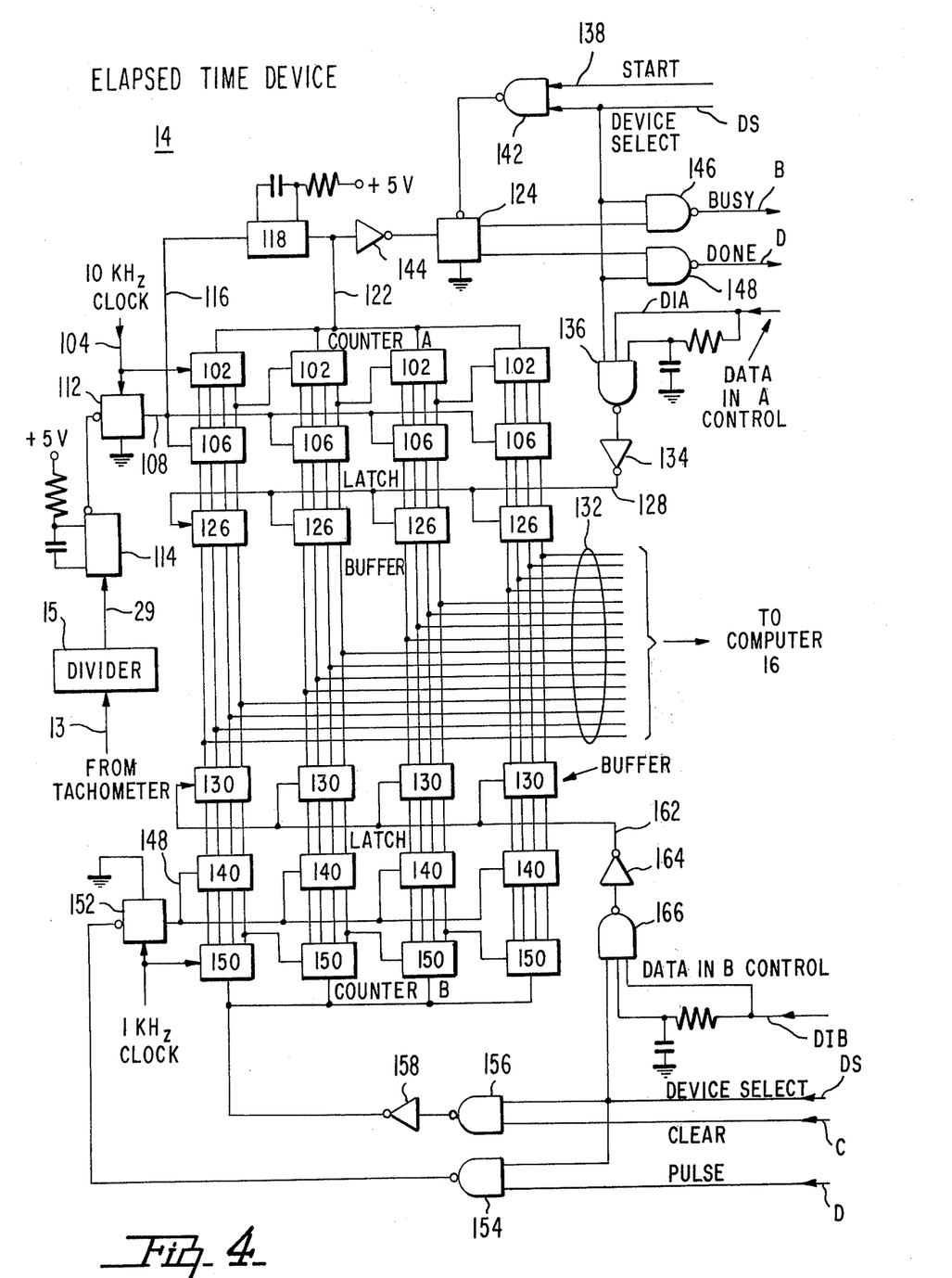
FIG. 4 is a logic diagram of the elapsed time device included in the system of FIG. 1.

FIG. 4 is a circuit diagram of the elapsed time device 14 of FIG. 1. Device 14 receives electrical pulses from tachometer 12 over line 13 and applies them through a divide-by-N-counter 15 to a one-shot multivibrator 114. The divider 15 is provided if the tachometer used produces more than one pulse per engine cycle. The output 29 from the divider 15 is one pulse per engine cycle.

The elapsed time device 14 includes two 16-bit counters each consisting of four 4-bit integrated circuits 102 and 150. The counters count the pulses applied over clock lines from clocks (not shown). The 16 outputs from each counter are coupled to 16 stages of a corresponding count latch consisting of integrated circuits 106 and 140. The count latches 106 and 140 receive and hold the count in their respective counter 102 and 150 when enabled by a transfer signal on line 108 or 148 from their respective transfer latches 112 and 152. Transfer latch 112 receives relatively infrequent pulses having a duration greater than the 0.1 msec duration of one cycle of the 10 KHz clock from a one-shot multivibrator 114, which responds to input pulses on line 29 from the divide-by-N counter 24. Transfer latch 152 receives its control signal from nand gate 154, which produces a low output signal when it simultaneously receives a "pulse" signal on line P and a "device select" signal over line DS from the computer 16.

The elapsed time unit 14 also includes two 16-bit buffers 126 and 130 each consisting of four integrated circuits, which can be enabled over lines 128 and 162 to transfer the 16-bit count in their respective count latch 106 or 140 to the computer 16 via the 16-conductor data bus 132. The buffers 126 and 130 are enabled by signals through inverters 134 and 164 from nand gates 136 and 166, respectively. Gates 136 and 166 provide an output when they receive both a device select signal over line DS from the computer and an appropriate "data in A" or "data in B" control signal over line DIA or DIB from the computer. In this way the computer can sample the data stored in either of the counter latches under program control as required. From the A counter latches, the computer periodically receives the count which represents the time period between two pulses representative of the engine speed.

In normal operation the elapsed time device 14 is initialized by the computer 16 by a "start" signal applied over line 138 to nand gate 142, simultaneously with a device select signal over line DS. The output of gate 142 causes the third latch 124 to assume a "busy" state. The latch 124 remains in the busy state until set to the "done" state by a signal through inverter 144 from the one-shot 118 when the count in counter 102 is transferred to the count latch 106. The busy or done status of Counter A of the timing unit is available to the computer 41 through lines B and D whenever the gates 146 and 148 are enabled by a "device select" signal on line DS from the computer.

"Counter B" of the timing unit operates completely under the control of the computer 16. It is reset or initialized by a signal through inverter 158 from nand gate 156. Gate 156 provides an output pulse when it receives both a "device select" signal over line DS from the computer and a "clear" pulse over line C from the computer. The contents of "counter B" is latched by the output of a control signal on line 148 from control latch 152. Control latch 152 is set by a low output pulse from nand gate 154. Gate 154 provides such an output pulse when it simultaneously receives a "device select" signal over line DS, and a "pulse" signal over line P from the computer 16. In normal operation this portion of the timing device is used for measurement of possibly long time periods in 1 msec increments. It is started by outputs on the DS and C lines from the computer. The time measurement is latched by outputs on the DS and P lines from the computer, and the measured time interval is transferred to the computer over lines 132 in response to outputs on DS and DIB from the computer.

In summary, the elapsed time device 14 continually measures and latches the time periods between successive pulses occurring once per engine cycle, and sets its own state to "done" each time an engine cycle time period is stored. The computer can then cause a transfer of the stored count in the latch through the buffer to the computer. The computer sets the timing device to the "busy" state whenever continued measuring of time periods is needed. The device 14 also measures and latches the total time period between a pulse at a low engine speed and a pulse at a high engine speed.

The elapsed time device 14 is not needed if the computer 16 employed includes a real time clock, and the program for the computer causes the computer to perform the time period measuring and storing function performed by the device 14.

The computer 16 may, by way of example only, be a "Nova 1200" minicomputer manufactured and sold by Data General Corporation, Southboro, Massachusetts, 01772. The Nova 1200 is a low cost minicomputer designed for general purpose applications. It has a 16-bit word, multi-accumulator central processor, and a full memory cycle time of 1200 nanoseconds. It executes arithmetic and logical instructions in 1350 nanoseconds. The entire Nova 1200 central processor fits on a single 15-inchsquare printed circuit subassembly board. The basic computer includes four thousand 16-bit words of core memory, a Teletype interface, programmed data transfer, automatic interrupt source identification, and a direct memory access channel. User programming conveniently can be in the BASIC language.

The display device 18 (FIG. 1) for use with the Nova 1200 computer may be a conventional Teletypewriter, a printer, a 4-digit display such as one including Numitron character display tubes, or any other similar display device.

Operation

The operation of the system of FIG. 1 will now be briefly described with references to the chart of FIG. 3, and later will be described in greater detail with references to the flow chart of FIG. 5.

In the initial condition, the engine 10 is operated at an idle speed of about 700 rpm, the tachometer 12 supplies pulses to the elapsed time device 14 which is continuously counting the time periods between engine cycle pulses after receiving a "start" signal from the computer 16, and the display 18 is displaying a "full throttle" message received from the computer 16.

The human test operator applies full throttle to engine causing it to accelerate to a governed high limit speed.

The computer continuously receives the count from counter A in device 14 for the time between engine cycle pulses until a count for an engine cycle $A_2$ is reached correspondingly a speed greater than the predetermined low speed of 1000 rpm. The preceding engine cycle $A_1$ corresponds to a speed less than the predetermined low speed of 1000 rpm. The computer then computes the time period $F_1$ (FIG. 3) and starts counter B in the device 14 to start the measurement of time period B.

The computer continuously receives the count from counter A in device 14 for the time between engine cycle pulses until a count for an engine cycle $A_4$ is reached corresponding to a speed greater than the predetermined high speed of 2000 rpm. The preceding engine cycle $A_3$ corresponds to a speed less than the predetermined high speed of 2000 rpm. The computer then stops the counter B in device 14 and computes the time period $F_2$.

The computer then adds the measured time period B to the computed time period $F_1$ and subtracts the computed time period $F_2$ to arrive at the time period T. The time period T represents the time required by the engine to full-throttle accelerate from 1000 rpm to 2000 rpm. If the time T is less than the predetermined value such as 0.8 seconds of a good engine, the computer causes a "normal power" message to appear on display 18. If the time T is greater than the predetermined value, the computer causes a "low power" message to appear on display 18.

Figure 5:
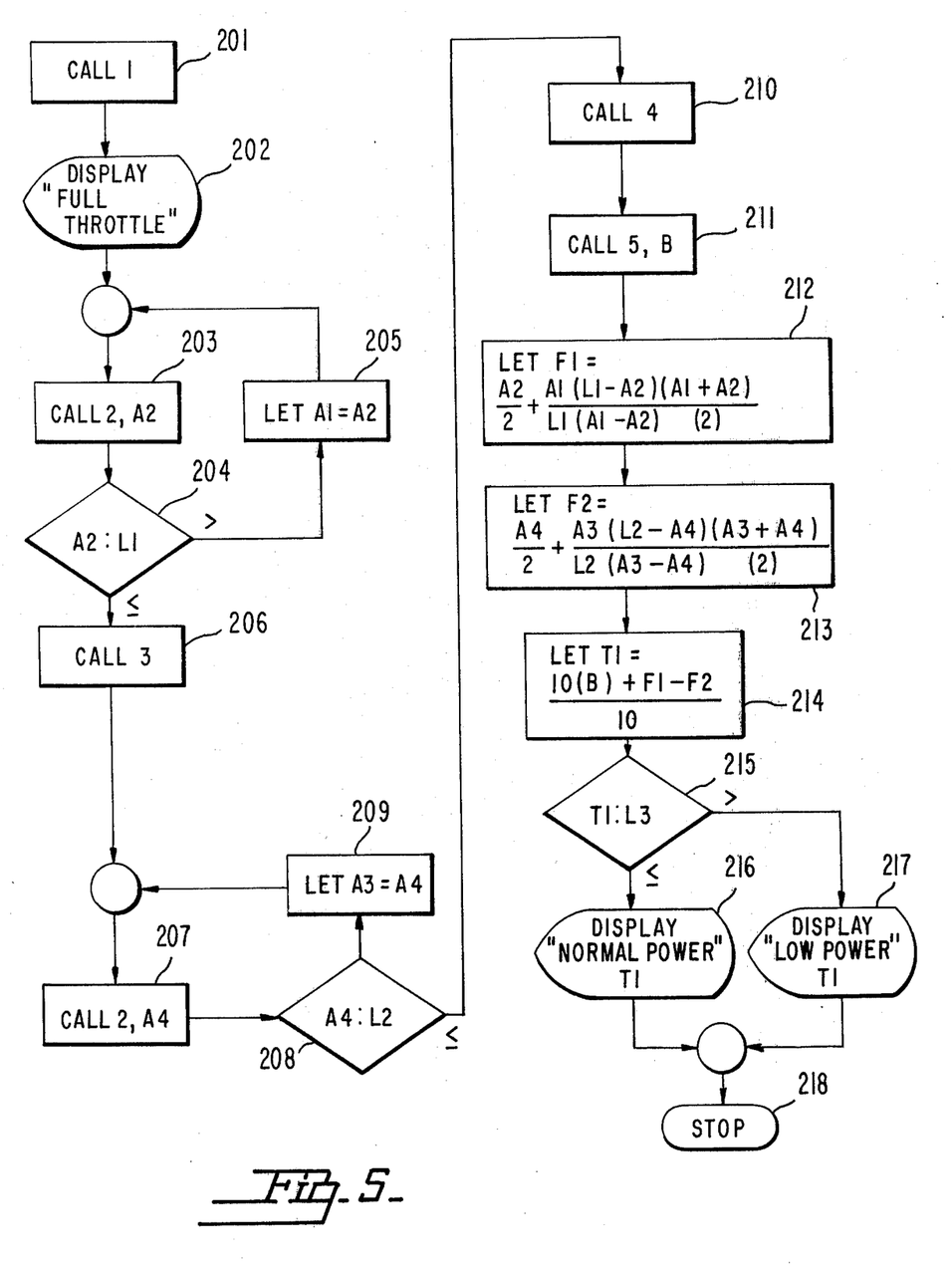
FIG. 5 is a flow chart of a program used in the computer in the system of FIG. 1 to control the test procedure and compute the test result.

The program flow chart of FIG. 5 can be used to describe the system operation and the computer functions within the system. A block-by-block description of the flow chart is given below:

| No. | Statement and Function |
|---|---|
| 201 | CALL 1. When the computer executes this instruction, the engine should be running at idle. This instruction causes the computer to send a START pulse to the Timing Device. This sets the device to the Busy state which essentially initializes the system preparing it for time period (speed) measurements. |
| 202 | DISPLAY "FULL THROTTLE". This instruction outputs the message "FULL THROTTLE" to the operator indicating that the system is ready. At this point the vehicle should still be operating at idle speed (600 to 800 RPM). |
| 203 | CALL 2, A2. This instruction causes the system to wait for the next timing device input pulse and then the computer inputs the time period between the last two pulses. This input value is saved as parameter A2. For a four cycle engine such as the LD465 with one pulse per engine cycle (2 revolutions) the A2 input at idle speed will be about 170.0 msec or A2 = 1700 (this corresponds to about 706 RPM). |
| 204 | IF A2 < = L1 THEN GO TO 206. This instruction is testing the vehicle speed looking for the beginning of the acceleration. If the acceleration time is to be measured between 1000 and 2000 RPM from one pulse per engine cycle L1 would be 120 msec or 1200 since the system measures time in 0.1 msec units. Upon execution of this instruction, the computer will compare the most recent input value of A2 with L1 and if it is less than or equal to L1, then the computer will execute statement 206 next; otherwise, it will execute the next instruction in sequence which is 205. |
| 205 | LET A1 = A2. Execution of this instruction simply sets the value of parameter A1 to that of the most recent input value of A2. |
| 205' | GO TO 203. This statement causes the computer to jump back to statement 203 for its next instruction. Thus, the computer keeps executing |

| No. | Statement and Function |
|---|---|
| | statements 203, 204, 205 and 205' until an average speed above the lower limit is detected. NOTE: The effect of the program loop created by statements 203 through 205' is to detect the beginning of an acceleration burst and to measure and save two time periods. The first time period, A1, corresponds to the time period whose average speed is just below the lower speed limit (1000 RPM in the example being discussed). The second time period, A2, corresponds to the time period immediately following that of A1. This period represents an average speed just equal to or slightly greater than the lower speed limit (1000 RPM in the example being discussed). |
| 206 | CALL 3. Execution of this instruction resets the B counters of the timing device. Thus, the B counters start measuring a time interval starting with the execution of this statement which is just after detection of an average engine cycle speed greater than the lower speed limit (1000 RPM in the example being discussed). |
| 207 | CALL 2, A4, |
| 208 | If A4 < = L2 THEN GO TO 210. |
| 209 | LET A3 = A4. |
| 209' | GO TO 207. NOTE: Execution of these instructions performs an operation similar to that of statements 203 through 205', except with respect to a time period test limit corresponding to the higher speed limit (2000 RPM in the example being discussed). When the computer detects a time period less than L2 (600 0.1 msec units for this example), A3 corresponds to the last time period measured where the average engine cycle speed was under 2000 RPM and A4 corresponds to the next measured time period where the average engine cycle speed was greater than 2000 RPM. Statement 210 is the next instruction executed after speed greater than 2000 RPM is detected. |
| 210 | CALL 4. Execution of this instruction by the computer latches the present value of the B counters of the elapsed time device. Since these counters started counting up from zero just after a speed greater than the lower limit was detected, and their data is now latched just after detecting a speed greater than the upper speed limit, the contents of the B latches is an approximate measure of the acceleration time between specified limits in msec units. |
| 211 | CALL 5, B. This instruction causes the computer to input the new time measurement latched in the B register of the timing device and to store this value as B. NOTE: At this time all five measurements required have been taken: These are: A1 = Last pulse period with average speed < 1000 RPM A2 = First pulse period with average speed > 1000 RPM A3 = Last pulse period with average speed < 2000 RPM A4 = First pulse period with average speed < 2000 RPM B = Time period between end of A2 and end of A4 The units of AX parameters are 0.1 msec and the units of B are msec. Other parameters used for acceleration time correction are the time periods corresponding to the ideal speed limits (lower and upper). The units for these time periods are 0.1 msec. L1 = 1200 (0.1 msec units) L2 = 600 (0.1 msec units) NOTE: The following three instructions perform the necessary interpolation and final output calculation. |
| 212 | LET F1 = A2/2+(A1*(L1−A2)*(A1+A2))/(L1*(A1−A2)*2). Execution of this instruction will calculate a value for F1 which is the estimated time period between the actual average speed crossing of the lower test speed limit and when the measurement of acceleration time (B) actually begins. This could be interpreted as an error calculation which will be used as a correction factor to increase the accuracy of the acceleration time measurement. This calculation is: $$F1 = \frac{A2}{2} + \frac{A1(L1-A2)(A1+A2)}{L1(A1-A2)(2)}$$ The significance of this calculation is discussed separately in the appendix. For the example being discussed F1 = 1591. |
| 213 | LET F2 = A4/2+(A3*(L2−A4)(A3+A4))/(L2*(A3−A4)*2). This is similar to instruction 212 except that it is a correction factor related to the upper speed limit rather than the lower speed limit. |

| No. | Statement and Function |
|---|---|
| | The actual calculation made is
$$F2 = \frac{A4}{2} + \frac{A3\,(L2-A4)\,(A3+A4)}{L2\,(A3-A4)\,(2)}$$
For the example being discussed F2 = 746. |
| 214 | LET T1 = (10*B + F1 − F2)/10. Execution of this instruction calculates the corrected acceleration time T1 by adding and subtracting the appropriate errors (F1 and F2). The factors of 10 included in the calculation are becuase of differences in units. The final value of T1 has units of mseconds. The calculation is:
$$T1 = \frac{10(B) + F1 - F2}{10}$$
For a normal military LD46S engine with no accessories the limits being used in the example of discussion T1 should be in the range of 460 – 500 msec. For the specific example being used T1 equals 613 indicating an engine with lower power output capabilities. |
| 215 | IF T1 > L3 THEN GO TO 217. This instruction is testing the vehicle acceleration rate by comparing the interpolated acceleration time (T1) with a low power test limit (L3). If T1 is too large it indicates low power, so the computer jumps to 217 to display "LOW POWER". For the example being discussed 535 msec would be a reasonable test limit for indicating low power. |
| 216 | DISPLAY "NORMAL POWER", T1. Execution of this instruction displays the result of the power test as well as the data, T1. |
| 216' | GO TO 218. This instruction causes the computer to branch to statement 218 and stop. |
| 217 | DISPLAY "LOW POWER", T1. This statement causes the output device to display "LOW POWER" and the calculated value of T1. In the example being used it would display "LOW POWER 613" (T1 being greater than L3 (613 > 535 msec) indicated Low Power). |
| 218 | STOP. This instruction causes the program to stop. |

APPENDIX

Interpolation Formula. The interpolation formula used for time correction factors assumes a linear average speed increase with time. Thus, it is assumed that the average speed for a given time period could be taken as exactly one half way through the given time interval. This results in the following interpolation correction formula for the acceleration time measurement.

$$F1 = \frac{A2}{2} + \left(\frac{S_2 - S_L}{S_2 - S_1}\right)\left(\frac{A2 + A1}{2}\right)$$

Where $S_2$ = The average speed of A2
$S_1$ = The average speed of A1
$S_L$ = The test limit speed corresponding to the time period test limit L1.

As can be seen from FIG. 3 the term A2/2 corresponds to the time interval between $t_2$ and the beginning of B. The remain term $$\left(\frac{S_2 - S_L}{S_2 - S_1}\right)\left(\frac{A2 + A1}{2}\right)$$

is the interpolated value of the time from crossing the lower speed limit to $t_2$. However, since a time period measurement corresponds to the inverse of a speed measurement $S_2 = 1/A2$, $S_1 = 1/A1$, and $S_L = 1/L1$. Thus, the F1 formula can be rewritten $$F1 = \frac{A2}{2} + \left(\frac{\frac{1}{A2} - \frac{1}{L1}}{\frac{1}{A2} - \frac{1}{A1}}\right)\left(\frac{A2 + A1}{2}\right)$$

or $$F1 = \frac{A2}{2} + \frac{A1\,(L1 - A2)}{L1\,(A1 - A2)}\left(\frac{A2 + A1}{2}\right)$$

as used in the test apparatus.

What is claimed is:

1. Means for measuring the time taken in a full-throttle acceleration burst test of an internal combustion engine in accelerating between a low speed and a higher speed, comprising
   tachometer means coupled to said engine to generate one electrical pulse per engine cycle of the engine,
   means for measuring the time periods between successive pulses, each time period constituting the reciprocal of the average speed of the engine during the particular engine cycle, and
   means for adding a portion of the time period corresponding with a low speed and a portion of the time period corresponding with a high speed to the intermediate time periods.

2. The combination as defined in claim 1, and means for determining said portion of the time period corresponding with the low speed to be the time between achievement of a specific predetermined low speed and the occurrence of the next following pulse, and for determining said portion of the time period corresponding with the higher speed to be the time between the achievement of a predetermined higher speed and the time of the preceding pulse.

3. The combination as defined in claim 2 wherein said means for determining said portions of the low speed and high speed time periods include means for accomplishing a straight-line interpolation between time-period average speeds which are above and below the predetermined speeds.

4. The method of measuring the time taken in a full-throttle acceleration burst test of an internal combustion engine in accelerating between a low speed and a higher speed, comprising generating one electrical pulse per engine cycle of the engine, measuring the time periods between successive pulses, each time period constituting the reciprocal of the average speed of the engine during the particular engine cycle, and adding a portion of the time period corresponding with a low speed and a portion of the time period corresponding with a high speed to the intermediate time periods.

5. The method defined by claim 4 and the additional steps of determining said portion of the time period corresponding with the low speed to be the time between achievement of a specific predetermined low speed, and determining said portion of the time period corresponding with the higher speed to be the time between the achievement of a predetermined higher speed and the time of the preceding pulse.

6. The method defined by claim 5 wherein the steps of determining said portions of the low speed and high speed time periods each include making a straight line interpolation between time-period average speeds which are above and below the predetermined speed.

* * * * *